Nov. 10, 1970  P. W. KARPER ET AL  3,538,758
TEST INSTRUMENT FOR DETERMINING THE PHYSICAL PROPERTIES
OF SOLID AND LIQUID VULCANIZABLE ELASTOMERIC MATERIALS
Filed Aug. 19, 1968                                    2 Sheets-Sheet 1

INVENTORS
PAUL W. KARPER
BY JOHN P. PORTER

Joseph Januszkiewicz
ATTY.

United States Patent Office 3,538,758
Patented Nov. 10, 1970

3,538,758
TEST INSTRUMENT FOR DETERMINING THE PHYSICAL PROPERTIES OF SOLID AND LIQUID VULCANIZABLE ELASTOMERIC MATERIALS
Paul W. Karper, Stow, and John P. Porter, Cuyahoga Falls, Ohio, assignors to The B. F. Goodrich Company, New York, N.Y., a corporation of New York
Filed Aug. 19, 1968, Ser. No. 753,628
Int. Cl. G01n 3/24
U.S. Cl. 73—101                                     9 Claims

ABSTRACT OF THE DISCLOSURE

An apparatus for determining the physical properties of solid and liquid vulcanizable elastomeric materials utilizing an oscillating cone shaped projection that is operative in a cone shaped cavity cooperative to define a thin walled hollow cone test chamber which is subject to an air pressure dome. The walls of the test chamber are heated during cure while a torque sensing device is connected to such cone shaped projection to measure the variation in force required to oscillate such cone shaped projection while a pressure gauge is connected to the cone test chamber to measure pressure change. A recorder is connected to the output of the torque sensing device and the pressure gauge to record the outputs simultaneously.

BACKGROUND OF THE INVENTION

In the present daily manufacturing of items made of elastomeric materials as well as in the accompanying research studies on such items, it is necessary to provide means for determining the blow-point and effect of blowing agents during cure of sponge type elastomers along with means for evaluating the effect of variations in the amount of materials in the compound mix and variations in the mixing procedure as it affects the final product. In the evaluation of compounds during such tests, it is desirable to obtain the cure curve of such mixes which gives such important characteristics as scorch time, optimum cure, minimum viscosity, reversion, shrinkage and the expansion characteristics of the compound as affected by the decomposition of the blowing agent. By optimum cure time is meant the time to cure the compound at a given temperature to give some optimum physical properties while the term scorch time refers to the time of the onset of cure at a given temperature. In addition, it is necessary to determine the proper amount and type of blowing agent plus the proper selection of temperature and time for vulcanization as well as the effect of accelerators on the product. In the process of establishing control over manufacturing techniques, it often becomes necessary to use instruments on the production line to continually check specimens of a compound to insure that such compound adheres to the prescribed limits of processing and where variations are necessary that a reliable test may be run rapidly providing accurate results. This entails an instrument that is reliable, versatile, and operative to quickly provide an accurate test.

SUMMARY OF THE INVENTION

The present invention provides a single test instrument which rapidly and accurately measures the dynamic properties of elastomeric materials, liquids, materials of low viscosity and those that have sponge type properties.

The present invention contemplates the use of a pair of spaced members cooperative to define a test chamber wherein one of the spaced members is oscillated relative to the other member to provide a shearing force on the specimen. A pressure measuring device is connected to the test chamber to provide an output signal that is proportional to the pressure developed. In addition, an output signal from a torque sensing device registers the cure torque curve for direct comparison with such pressure developed.

The decomposition of the chemical blowing agent affects the structure by developing pressure during cure and where such pressure is developed early in the cure the cell structure in the final product will be substantially open whereas where such pressure develops lat in the cure the cell structure of the final product is closed cell. A closed cell material is one in which air pocket or cell is completely surrounded by a cell wall which is sufficiently strong to contain the gas without rupturing. An open whereas where such pressure develops late in the each other. This is produced by rupturing the cell walls after their formation by some means such as a sudden release of pressure in the mold. Open cell compounds have weak cell walls to facilitate the rupturing of the walls. The variations in cell structure are great and through the use of the instrument of the present invention it is possible to precisely control the structure of the final product by accurately providing and comparing the cure curve of a product with the pressure developed within the product as affected by the decomposition of the chemical blowing agent. Such instrument not only compares the cure curves and pressure developed where quantity and type of blowing agents are varied but also effectively provides accurate data on the physical characteristics where the compound mix is varied and the quantity and blowing agent are held constant.

Figure 1:
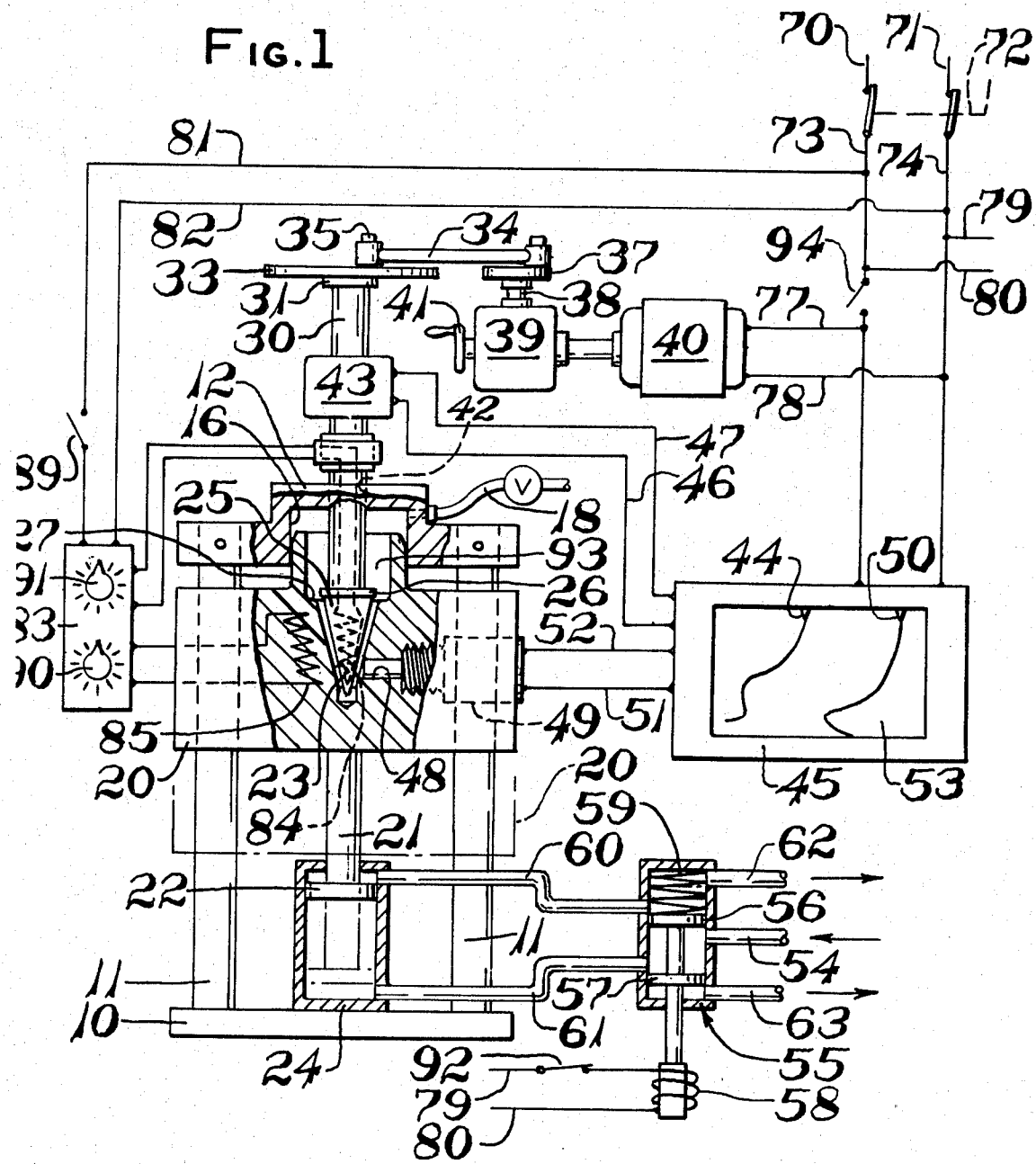
FIG. 1 is a schematic front elevational view of the apparatus, partially in section, illustrating the relationship of the various control elements of the apparatus.

Referring to the drawings wherein like reference characters designate like or corresponding parts throughout the several views, there is shown in FIG. 1 a base plate 10 having attached thereto a plurality of upstanding rods 11 which supports a stationary upper die member 12. Die member 12 has a cylindrical recess 16 with a passageway extending therethrough for communicating cylindrical recess 16 with a conduit 18 which is adapted to be connected to a pressure source, not shown.

Figure 2:
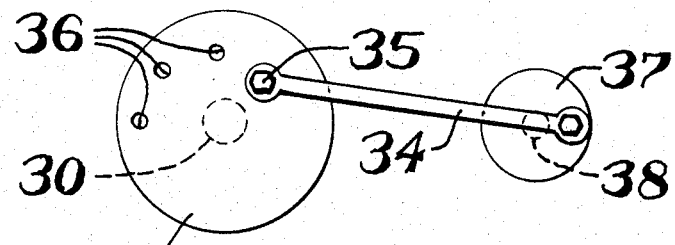
FIG. 2 is a plan view of the connection between the drive wheels for oscillating one of the die members.

Movable upwardly into abutting contact with the upper die member 12 is a lower die member 20, which die member 20 is mounted on the end of a vertical piston rod 21 which is attached to a piston 22 movable within a double-acting fluid pressure cylinder 24, which is mounted on base plate 10. As piston 22 moves within its cylinder 24, die member 20 may be moved toward or away from die member 12. Lower die member 20 has a conically shaped serrated recess 23 at its center portion which is adapted to receive a cone-shaped serrated rotor 25 which is journaled in upper die member 12 for a purpose to be described. Rotor 25 has a lip 26 on its base portion for cooperation with an annular ring or lip 27 on recess 23 to define a substantially closed cavity with a restrictive passageway thereby for a purpose to be described. Lower die member 20 is guided in its vertical upward and downward movement by the plural vertically extending guide rods 11 which are secured to the base plate 10 and the stationary die member 12. A shaft 30 suitably supported by support means not shown is journaled in a bushing 31 for connection to a wheel member 33 for rotation therewith. As shown in FIGS. 1 and 2, one end of a crank member 34 is pivotably mounted by means of a movable pin 35 to wheel 33. As shown in FIG. 2, wheel 33 has a plurality of pin receiving index holes 36, each at a different radial spacing from the vertical axis of wheel 33. An eccentric drive wheel 37 is mounted on an output shaft 38 of a variable speed reducer 39 driven by a motor 40. The other end portion of crank 34 is pivotably mounted to such eccentric drive wheel 37 to transfer the rotational movement of shaft 38 to an oscillating motion in wheel 33 and shaft 30. The amplitude of the oscillation of wheel 33 is dependent upon the particular mounting of pin 35 in index holes 36 of the wheel 33, while the frequency of oscillation is dependent upon the output speed of the variable speed motor 40 as controlled by handwheel 41.

Shaft 30 extends downwardly through a central bore 42 in the upper die member 12 for connection to the cone rotor 25 to provide the oscillation thereto. Mounted on shaft 30 is a torque sensing pick-up device 43 utilizing a bonded resistance wire strain gauge, which responds to torque forces in shaft 30 to actuate a pen 44 of a recorder 45 through electrical lines 46 and 47. Such pickup device 43 is well known in the art and therefore neither illustrated nor described in detail, wherein such wire strain gauges are bonded to the shaft 30 in such a position and are so connected into a bridge circuit, that they cancel the effects of bending and thrust strains while adding the effects of torsional strain, with the relation between bridge unbalance and torsional strain being linear. Such pick-up devices are manufactured by the Baldwin-Lima-Hamilton Corporation, located in Waltham, Mass. Such devices are also manufactured by Lebow Associates, Inc., located in Oak Park, Mich.

Lower die member 20 has a horizontally extending stepped bore 48 which suitably receives a pressure measuring device or transducer 49 which device 49 has a diaphragm at the one end adjacent to the recess 23 to measure directly the pressure in such recess. Such pressure measuring device 49 provides an electrical output signal that actuates a pen 50 on recorder 45 through electrical lines 51 and 52 to record the pressure on a moving chart 53 simultaneously with the recording of the torque by pen 44. Such transducers or pressure measuring device 49 is well known in the art and readily available on the open market. Manufacturers of this device include Cynisco, a division of Microdot, Inc., 20 Southwest Park, Westwood, Mass. 02090.

Fluid for moving piston 22 within its cylinder 23 is supplied from a source under elevated pressure, not shown, through supply line 54 to a four-way, spring return solenoid operated valve 55, having pistons 56 and 57 moved either by the action of solenoid 58 or return spring 59. Fluid is either supplied to or exhausted from cylinder 23 by means of conduits 60 and 61. Fluid exhausted from cylinder 23 passes through valve 55 to fluid exhaust conduits 62 and 63.

The electrical power for the control operation is supplied by the electric lines 70 and 71 which are connected to a source of electrical power not shown. A double pole, single throw switch 72 connects lines 70 and 71 to main control lines 73 and 74 which lead to the torque pick-up recorder 45. Lines 77 and 78 connect motor 40 to lines 73 and 74, respectively. Lines 79 and 80 supply power to the solenoid 58 while lines 81 and 82 supply power to die members temperature control unit 83 which, in turn, is connected to heating coils 84 and 85 embedded in the rotor 25 and lower die member 20, respectively. Thermocouples (not shown) are provided closely adjacent to the chamber defined by the conical bore 23 and the cone rotor 25 to sense the temperature of the material confined. These thermocouples are connected to a suitable temperature recorder to record the temperature continuously during the operation of the testing instrument. In performing tests with the test instrument described above, the operator preheats the lower die member 20 by closing the main control switch 72 and switch 89 located in line 81 and setting control knobs 90 and 91 on temperature control unit 83 for the desired temperature. The operator then takes a sample of material and places such material in the conical shaped recess 23, after which the operator closes normally open switch 92 to energize solenoid 58 and thereby cause piston 22 to move to its position as shown in full line in FIG. 1 to move lower die member 20 toward die member 12. As such die members 20 and 12 are brought together, the cone shaped rotor 25 forces the test material to fill the recess 23 completely with the excess being forced outwardly between the clearance space provided between lip 26 and the adjacent wall of recess 23 of lower die member 20. Such clearance space is maintained, with the lip 26 aiding die member 20 to consolidate the sample. With such sample confined between the conical recesses 23 of lower die member 20 and the cone rotor 25, air pressure is introduced and maintained on such sample of material in such test chamber through an air dome 93 immediately above such cone rotor 25 as defined by the recess 16 and the upper cup shaped portion of die member 20. Such air dome 93 is supplied with air pressure through conduit 18 which is connected to a suitable pressure source not shown and maintains pressure on such sample of material to assure curing without porosity. The dome 93 may be pressurized with inert gases or with those selected to give a desired result. When the air dome has air which supplies oxygen to the test sample being worked, then the operator may run such test in nitrogen to prevent such occurrence and obtain results that are unaffected by surrounding air.

Upon closing of switch 94 motor 40 is energized thereby causing rotor 25 to oscillate at a preset frequency. Simultaneously with such action a predetermined pressure is maintained in the air dome 93, which maintains the sample in the cavity defined by the rotor 25 and the walls of the cone-shaped recess 23 to cure such sample of material. The sample assumes a thin walled cone configuration thereby assuring a uniform faster heating than in prior test apparatus; particularly with heat supplied to both sides of the sample. This permits test curing the samples at lower temperatures by at least 10° Fahrenheit. Curing at lower temperatures avoids blistering of the material in many instances. During such action, load cell 43 will provide an output signal which is recorded on chart 53 to indicate the thrust during cure as indicated on the chart in FIG. 4. Cure occurs when the molecules become tied or bonded together which depends on the cure material. Thus, during cure a cross linking occurs as between a sulphur molecule and two carbon molecules or a disulphur cross link may occur when two sulphur molecules cross link with two carbon molecules. As more cross links occur during cure the material becomes stiffer and there is increased resistance to deformation which is reflected in the cure curve of FIG. 3 or 4 by an increase in the cure torque value. Note FIG. 4 has an increase in cure torque from point X to Z wherein such torque increases from 7 inch pounds to approximately 13½ inch pounds. Such increased resistance to deformation is loss in mobility of the elastomeric material. Reversion takes place when the cross links are gradually destroyed such that the elastomeric material becomes more mobile and less resistant to deformation which is reflected in FIG. 4 by a decrease in the torque so that the curve falls off slowly in value as from point Z to Z' in FIG. 4. A material is fully cured when the torque reaches a maximum value. Shrinkage may occur in the test material and cause a fall in the torque value if during such curing process the material cures and occupies less volume. The test instrument of the invention compensates for such shrinkage when it occurs by the preset pressure maintained in the head end of cylinder 24 which compensates for the shinkage thereby maintaining the preset pressure on the sample of material being tested. Simultaneously with the curing action, the pressure developed on the test sample is transmitted via transducer 49 and lines 51 and 52 to the recorder 45 which records such pressure onto chart 53 simultaneously with the recording of the cure torque.

Figure 3:
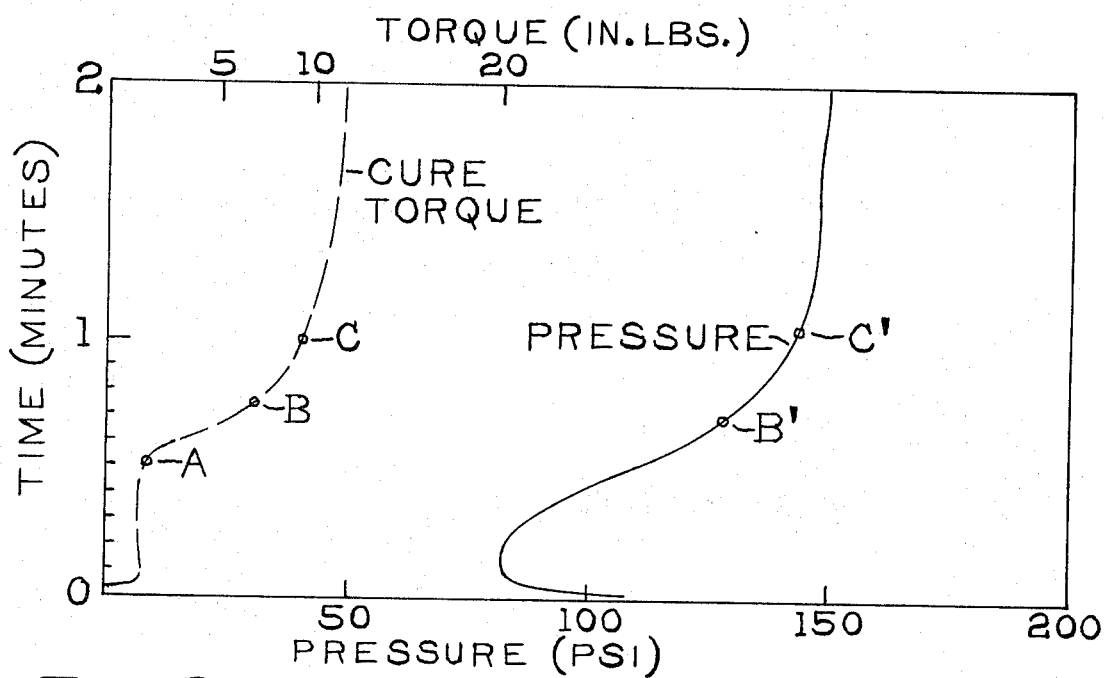
FIG. 3 is a chart illustrating the cure and pressure curves of a sample of material obtained through the use of the apparatus illustrated in FIG. 1.

FIG. 3 is representative of a test made on an instrument of the above-described invention wherein the pressure curve discloses that the pressure developed initially is 100 p.s.i. which is due to the closing of the cavity since the test sample of material is cold and must be deformed by the cone as it enters the cavity. As the material is worked by the cone and heated to the preselected temperature of the die member 20 and the cone shaped rotor 25 the pressure drops to 75 p.s.i., the preset dome pressure, and after two-tenths of a minute of elapsed time, the chemical blowing agent begins to decompose and exert a pressure which builds up rapidly at a linear rate for the next minute during which time the material begins to cure which is indicated on the chart as point A of the torque curve. At point B sufficient chemical decomposition of the blowing agent has occurred to develop the blowing properties of the sponge type product and the material has been cured sufficiently to possess the strength to maintain the final product in the open cell form. This type of product would make a good open cell sponge. Point C indicates that the cure is complete and C' that the chemical blowing agent has been completely developed.

Figure 4:
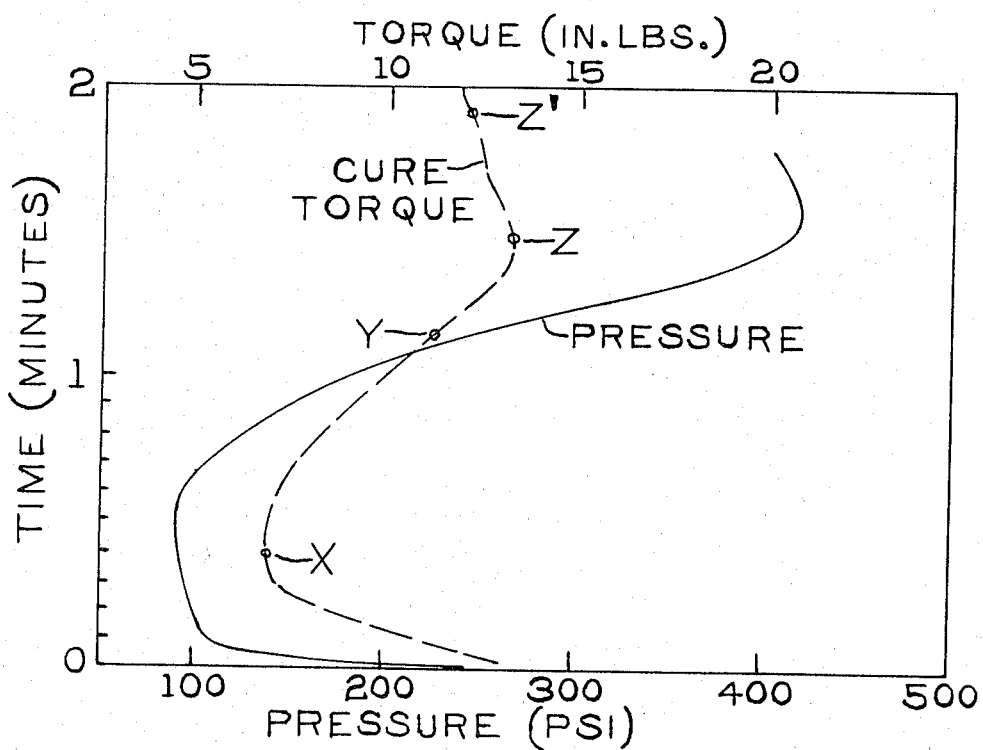
FIG. 4 is a chart similar to that in FIG. 3 illustrating the cure curve and pressure curve of a different sample of material.

FIG. 4 discloses the cure curve and pressure curve of a different type of material wherein the pressure curve is at approximately 100 p.s.i. for .7 of a minute while the cure torque curve shows signs of beginning cure at point X and that if such product were released from further cure the product would be one unaffected by the blowing agent and be substantially non-porous. At point Y sufficient chemical blowing agent decomposition has occurred to provide a porous closed cell product since approximately 250 p.s.i. pressure has developed and the material has considerable strength. At point Z, the cure curve indicates complete cure while the pressure curve indicates approximately 425 p.s.i. has developed such that the cell structure of the material could be ruptured and the final product would be one of open porous type.

Various modifications are contemplated and may obviously be resorted to by those skilled in the art without departing from the spirit and scope of the invention, as hereinafter defined by the appended claims, as only a preferred embodiment thereof has been disclosed.

We claim:

1. An apparatus for determining the physical properties of solid and liquid vulcanizable elastomeric material comprising die means cooperable to define a sample receiving chamber for receiving a test sample for testing such materials, means connected to one of said die means for oscillation thereof to provide a shearing force on said sample received by said chamber, means operatively connected to said oscillating means for measuring said shearing force and providing an output signal therefrom, means to move said die means into cooperative engagement to maintain a pressure on said sample of material held by said die means; a pressure dome operatively connected to said test chamber through a restrictive opening therebetween wherein pressurized fluid in said pressure dome is operative to maintain a preselected fluid pressure on a test sample confined in said chamber; means connected to said pressure dome for regulating the flow of pressurized fluid therein and the pressure developed in said dome; means connected to said sample receiving chamber and operative for measuring the pressure developed in said chamber for providing an output signal, means to heat said die means to a predetermined temperature, indicator means operative to receive said output signals for indicating their values for use in analyzing said materials.

2. An apparatus as defined by claim 1 wherein said die means are cooperative to define a hollow cone cavity with a restrictive opening along the upper end portion of said hollow cone cavity, and said die means are cooperative with a housing to define said pressure dome that communicates with said hollow cone cavity through said restrictive opening.

3. An apparatus for the determination of physical properties of vulcanizable elastomeric materials comprising: a pair of spaced die members; one of said die members being recessed to provide a cavity, the other of said die members having a projection for movement into said cavity and cooperative therewith to define a test chamber; a compartment communicating with said test chamber through a restricted opening; means for regulating the fluid pressure in said compartment; means to heat said one die member and said projection to a predetermined temperature; means to move said one die member toward the other die member to position said projection into said cavity operative to maintain a pressure on the sample of material confined in said test chamber; pressure measuring means connected to test chamber for providing a first output signal; means to heat said die members and said projection; a drive shaft connected to said projection for driving said projection; drive means having a preselected constant input operatively connected to said drive shaft for imposing an oscillatory rotary force and motion to said projections; torque measuring means connected to said drive shaft for measuring the torque thereon to provide a second output signal; and recorder means operative to receive said output signals for recordation simultaneously to provide a comparison of said outputs and the values thereof.

4. An apparatus for the determination of physical properties of vulcanizable elastomeric materials as set forth in claim 3 wherein said projection has an annular lip cooperative with the upper end portion of said cavity upon movement of said projection into said cavity to provide said restrictive opening that communicates with a pressure dome in said compartment.

5. An apparatus for determination of physical properties of vulcanizable elastomeric material comprising a pair of die members; said die members are cooperative with a housing to define a closed air chamber; pressurized means connected to said pressure dome for maintaining a predetermined adjustable pressure thereon; one of said die members having a cone shaped cavity; the other of said die members journaling a cone shaped projecting means; an annular lip on said cone shaped member; means to move said one die member to and from said other die member to relatively move said cone shaped member into said cone shaped cavity to exert a pressure on a sample of material positioned in said cone shaped cavity; said lip on said cone shaped member cooperative with an annular ring on the upper edge portion of said cavity to define a test chamber for the sample of material wherein said annular lip and annular ring provide a restrictive passageway between said closed air chamber and said test chamber; drive means connected to said one die member and operative to impose an oscillatory shearing force thereon and on the material being tested in said cavity; means for heating said cone shaped member and said one die member to a predetermined temperature; torque responsive means for measuring the force required to oscillate said other die member and provide an output signal; pressure measuring means operatively connected to said test chamber for measuring the pressure developed in said test chamber and providing an output signal; and means connected to said apparatus for receiving and recording said output signals onto a chart to provide means for comparing the cure torque developed on the sample of material with the pressure developed by the sample of material.

6. A method for determining physical properties of elastomeric materials comprising: subjecting an enclosed sample of material to a first pressure, thence subjecting said confined sample to oscillating shearing strains from an input source having predetermined constant rate and amplitude of oscillation, subjecting said sample of material to a predetermined fluid pressure simultaneously while being subjected to said oscillating shearing strain and said first pressure, and measuring the torsional resistance to these shearing forces and the pressure developed by said sample of material simultaneously.

7. The method for determining the physical properties as set forth in claim 7 wherein said predetermined fluid pressure is a predetermined adjustable fluid pressure dome operative to prevent porous curing of rubber.

8. The method for determining the shearing torque as set forth in claim 7 wherein said subjecting of said sample of material to a predetermined fluid pressure is an atmosphere of inert gas.

9. The method for determining the physical properties as set forth in claim 9 wherein said gas is nitrogen.

References Cited

UNITED STATES PATENTS 3,182,494   5/1965   Beatty _____ 73—101

FOREIGN PATENTS 163,787   8/1964   U.S.S.R.

JAMES J. GILL, Primary Examiner

M. SMULLAR, Assistant Examiner

U.S. Cl. X.R.

73—59, 15.6

Attorney's File No. 16833

PO-1050 (5/69)

UNITED STATES PATENT OFFICE
CERTIFICATE OF CORRECTION

Patent No. 3,538,758     Dated November 10, 1970

Inventor(s) Paul W. Karper and John P. Porter

It is certified that error appears in the above-identified patent and that said Letters Patent are hereby corrected as shown below:

Column 2, line 9, "lat" should read ---late---; lines 13-15, "An open whereas where such pressure develops late in the each other." should read ---An open cell material is one in which cells are open to each other.---

Signed and sealed this 10th day of August 1971.

(SEAL)
Attest:

EDWARD M. FLETCHER, JR.
Attesting Officer

WILLIAM E. SCHUYLER, JR.
Commissioner of Patents